Nov. 7, 1967 K. RIEMENS 3,351,863

ADJUSTABLE DAMPING NETWORK

Filed Jan. 20, 1964

INVENTOR.
KAREL RIEMENS
BY
[signature]
AGENT

United States Patent Office 3,351,863
Patented Nov. 7, 1967

3,351,863

ADJUSTABLE DAMPING NETWORK

Karel Riemens, Emmasingel, Eindhoven, Netherlands, assignor to North American Philips Company Inc., New York, N.Y., a corporation of Delaware Filed Jan. 20, 1964, Ser. No. 340,122
Claims priority, application Netherlands, Jan. 29, 1963, 288,320
8 Claims. (Cl. 328—171)

This invention relates to adjustable damping networks for the transmission of signals with an adjustable transmission factor dependent upon a control voltage. Such networks may, for example, be employed for dynamic control and level control of the signals. The term "transmission factor" as used hereinafter means the ratio between the output voltage and the input voltage.

Known arrangements of this kind utilize non-linear resistors, for example in the form of rectifiers or current-dependent resistors. In designing such networks, however, practical difficulties are encountered due to the characteristics of the non-linear resistors, especially if an accurately prescribed control characteristic is desired over a large control range.

An object of the invention is to provide an adjustable network wherein undistorted transmission of signals is obtained over a very large control range, with a transmission factor which varies in direct proportion to the control voltage, and wherein the transmission is not affected by the characteristics of the elements of the network.

According to the invention, in order to obtain a transmission factor that varies in proportion to the control voltage, the adjustable damping network is comprised of an amplitude limiter. The control voltage is applied to the limiter as a limiting voltage. An auxiliary carrier wave, supplied by an auxiliary carrier oscillator, and the signal to be transmitted, are applied together to the input circuit of the amplitude limiter. A filter for selecting the signal to be transmitted is connected to the output circuit of the amplitude limiter.

Figure 1:
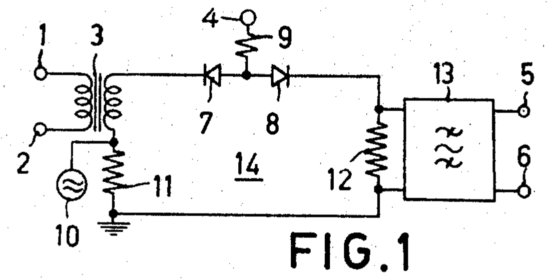
Figure 2A:
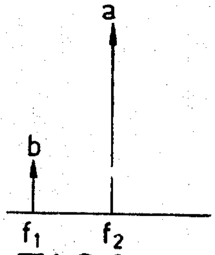
Figure 2B:
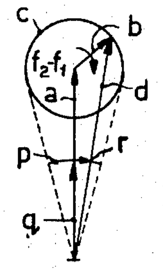
Figure 2C:
Figure 2D:
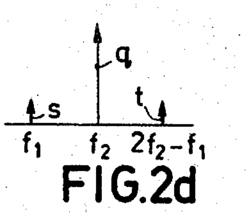
Figure 3:
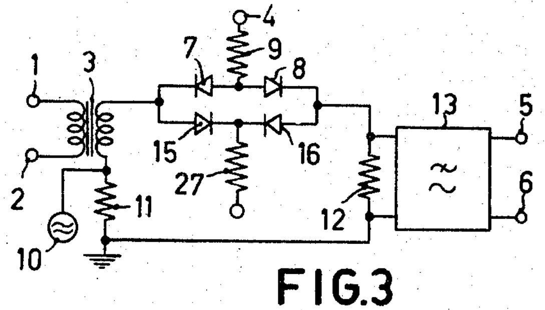
Figure 4:
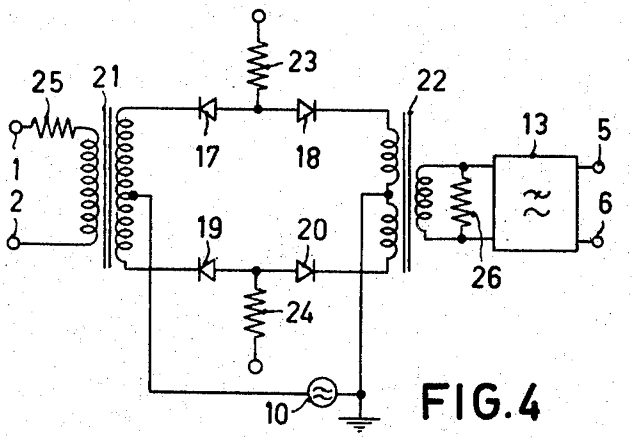

In order that the invention may be readily understood, it will now be described in detail, by way of example, with reference to the accompanying drawings, in which:

FIGURE 1 is a circuit diagram of an adjustable damping network according to the invention;

FIGURES 2*a*, 2*b*, 2*c* and 2*d* illustrate several diagrams to explain the damping network of FIGURE 1, and FIGURES 3 and 4 show two very advantageous embodiments of an adjustable damping network according to the invention.

In the adjustable damping network according to the invention as shown in FIGURE 1, information signals, for example speech signals, originating from input terminals 1, 2 are applied by way of an input transformer 3 to the network. The transmission factor of the network is controlled by a control voltage applied between a voltage terminal 4 and ground. The output voltage, which is controlled in magnitude by the control voltage, is derived from terminals 5, 6 of the adjustable damping network.

To obtain a transmission factor which is directly proportional to the control voltage with undisturbed transmission of signals, the adjustable damping network comprises an amplitude limiter 14 including two rectifiers 7, 8 connected to conduct in opposite direction. The control voltage is applied to the common point of the rectifiers 7, 8 by way of resistor 9. The control voltage is a limiting voltage which delivers a current in the pass directions of the rectifiers 7, 8. A resistor 11 is connected in series with the transformer 3 in the input circuit of the amplitude limiter. An auxiliary carrier wave from an auxiliary carrier oscillator 10 is connected to the end to a resistor 11 connected to transformer 3. The output circuit of the amplitude limiter 14 is comprised of a resistor 12 connected to the input of a filter 13 for selecting the output signal, which varies in magnitude in direct proportion with the control voltage.

In the arrangement described, the voltage across the input circuit of the limiter 14 is composed of the sum of the auxiliary carrier oscillation and the information signal. Whenever this sum exceeds the voltage at the common point of the rectifiers 7, 8, the rectifier 7 is cut-off and a constant current flows via the resistor 9, which has a comparatively high value, through the rectifier 8 to the output resistor 12. Conversely when the voltage across the input circuit of the limiter 14 is lower than the voltage at the common point of the rectifiers 7, 8, the rectifier 7 conducts and the rectifier 8 is cut-off so that no current flows to the output resistor 12. A limitation of the signals applied to the input circuit of the limiter 14 is obtained across the output resistor 12 at exactly the value of the control voltage. The information signals, after selection in the filter 13, are derived from the output terminals 5, 6.

In the above described circuit, when the auxiliary carrier oscillation of frequency $f_2$ is greater in amplitude than that of the information signal of frequency $f_1$, an undistorted transmission of the information signal $f_1$ is obtained with a transmission factor which is directly proportional to the control voltage through a very wide control range. The reasons for this effect will now be described in detail with reference to the diagrams shown in FIGURES 2*a*–2*d*.

For illustrative purposes the auxiliary carrier wave of frequency $f_2$ and amplitude $a$ and the information signal of frequency $f_1$ and amplitude $b$ are shown in a frequency diagram in FIGURE 2*a*, the amplitude $a$ of the auxiliary carrier wave being greater by a factor of about 4 than the amplitude $b$ of the information signal.

These two signals may be added together in the manner shown in the vector diagram in FIGURE 2*b*, the auxiliary carrier wave being shown by a vector $a$ and the information signal by a vector $b$ which rotates about the end of vector $a$ at the difference frequency $f_2-f_1$. The locus of the end of vector $b$ is the circle $c$. The sum vector is shown by a vector $d$. The top of vector $d$ follows the circumference of circle $c$ at the difference frequency $f_2-f_1$.

When these voltages are applied to the limiter 14 the sum vector $d$ is limited to the limiting voltage which has, for example, a value $p$ as shown in FIGURE 2*b*. This results in a constant value vector which varies in phase and which can be decomposed into a vector $q$ in the direction of the vector $a$ and a vector $r$ which is at right angles thereto and having value which varies in the rhythm of the difference frequency $f_2-f_1$.

As may be seen from FIGURE 2*b*, the value of the vector $q$ is substantially equal to the limiting level $p$, so that $q=p$, and the maximum value of vector $r$ is $$r_{max}=p\frac{b}{a}$$

When the auxiliary carrier wave of frequency $f_2$, and the information signal of frequency $f_1$, are applied to the input circuit of the limiter having a limiting voltage $p$, the amplitude $a$ of the auxiliary carrier wave being considerably greater than the amplitude $b$ of the information signal, the limitation results in an oscillation $q$ of frequency $f_2$ and an amplitude equal to the limiting level $p$ and an oscillation $r$ of maximum amplitude $$r_{max}=p\frac{b}{a}$$

which varies in amplitude in the rhythm of the difference frequency $f_2-f_1$. The vector $r$ can be decomposed, as shown in FIGURE 2*c*, into two vectors $s$, $t$ of constant value which rotate in opposite directions. The value of each vector is half the maximum amplitude of the vector $r$ so that $$s = t = p\frac{b}{2a}$$

When shown in a frequency diagram, the vectors $s$, $t$ represent voltages of frequencies located on each side of the auxiliary carrier wave $f_2$ at a frequency distance $f_2-f_1$ therefrom. The oscillation $s$ of a frequency $f_2-(f_2-f_1)=f_1$ equal to that of the information signal and of an amplitude $$p\frac{b}{2a}$$

is applied through the selection filter 13 to the output terminals 5, 6. The auxiliary carrier wave $f_2$ and the other unwanted oscillations are removed by the filter 13. If desired, however, the oscillation $t$ instead of the oscillation $s$ may be selected by the filter 13.

There is great freedom in the choice of the frequency of the auxiliary carrier oscillation, but for an accurate transmission of signals it is advantageous to choose the frequency for the auxiliary carrier wave separate from the information signal by at least a frequency distance equal to the bandwith of the information signal. For example, the frequency of the auxiliary carrier oscillation is at least 8 kc./s. for a speech signal of 0.4 to 4 kc./s.

If it is ensured that the amplitude of the auxiliary carrier oscillation is considerably greater than that of the information signal, the output signal obtained at the output terminals of the adjustable damping network 14 has an amplitude which is exactly proportional to the amplitude of the information signal applied to the input terminals 1, 2 or, in other words, the information signal is transmitted via the damping network 14 free from distortion. At the same time it appears from the amplitude value of the output signal $$p\frac{b}{2a}$$

that the amplitude of the output signal is directly proportional to the limiting voltage $p$. If, for example, the limiting voltage $p$ varies by a given factor, the output signal will vary by exactly the same factor so that the transmission factor of the network described varies in exactly linear relationship with the control voltage.

Apart from a substantial independency of the properties of the elements employed, the adjustable network described is distinguished by having an undisturbed transmission with a transmission factor which varies in exactly linear relationship with the control voltage. For example, in the arrangements described, a deviation of 1 db from linearity was measured over a control range of 45 db.

FIGURE 3 shows a variation of the arrangement shown in FIGURE 1, identical elements being indicated by the same reference numerals.

In this arrangement the limiter including the rectifiers 7, 8 is bridged by a limiter including rectifiers 15, 16 having pass directions opposite to those of the rectifiers 7, 8. The control voltage applied through a resistor 27 to the common point of the rectifiers 15, 16 is equal in value to the voltage applied to the rectifiers 7, 8, but of opposite polarity.

In the arrangement shown the two limiters formed by the rectifiers 7, 8 and 15, 16 respectively are alternately active in the rhythm of the frequency of the auxiliary carrier wave. The information signal is derived from the output terminals 5, 6 through the selection filter in the form of a lowpass filter 13 in the manner as already explained with reference to FIGURE 1. Due to the use of a push-pull type of the limiter, the components of the control voltage balance one another in the output resistor 12 of the limiter. This is very advantageous especially in dynamic control, since the dynamic control voltage contains frequency components situated near the lowest frequency components of the signal.

FIGURE 4 shows a further embodiment of an adjustable damping network according to the invention.

In this embodiment two identical limiters each including two rectifier 17, 18 and 19, 20 respectively having opposite pass directions are connected between the secondary winding of an input transformer 21 and the primary winding of an output transformer 22. The control voltage is applied to the common points of the rectifiers 17, 18 and 19, 20 through resistors 23 and 24, respectively. The information signal is applied to the input transformer 21 through a resistor 25 and the auxiliary carrier oscillator 10 is connected between the centre tappings on the secondary winding of the input transformer 21 and the primary winding of the output transformer 22. An output resistor 26 is connected to the secondary winding of the output transformer 22, leading through the selection filter 13 in the form of a lowpass filter to the output terminals 5, 6.

In the manner explained above, the transmission factor of the information signal derived from the output terminals 5, 6 varies during the transmission by the adjustable damping network in direct proportion with the control voltage applied to the rectifiers 17, 18 and 19, 20 respectively. Since in this arrangement the control voltage and the auxiliary carrier wave are supplied with equal phase to the two limiters including the rectifiers 17, 18 and 19, 20 respectively, these two oscillations balance each other in the output resistor 26 so that the selection requirements for the filter 13 are considerably simplified.

What is claimed is:

1. An adjustable damping circuit comprising a source of signals, a source of auxiliary oscillations, having a frequency outside the frequency band of said signals, amplitude limiter means, means for applying the vectorial sum of said signals and oscillations to said amplitude limiter means for producing amplitude limited oscillations, a source of an adjustable control voltage connected to said limiter means for controlling the limiting level thereof, output circuit means, and means for applying said limited oscillations to said output circuit means comprising filter means for removing oscillations of the frequency of said auxiliary oscillations from the oscillations applied to said output circuit means.

2. The damping circuit of claim 1 in which the amplitude of said auxiliary oscillations is substantially greater than the amplitude of said signals.

3. The damping circuit of claim 1 in which said auxiliary oscillations have an amplitude at least four times as great as the amplitude of said signal.

4. The damping circuit of claim 1 in which said signals have a predetermined bandwidth, and the frequency of said auxiliary oscillations is separated from the band of said signals by a frequency distance at least equal to said bandwidth.

5. An adjustable damping network comprising a source of signals, a source of auxiliary oscillations having an amplitude substantially greater than the amplitude of said signals, and a frequency higher than the frequency of said signals, amplitude limiting means having an adjustable limiting level, means for applying the vectorial sum of said signals, and auxiliary oscillations to said amplitude limiting means for producing amplitude limited oscillations, output circuit means, and filter means connected to apply only oscillations of the frequency of said signals to said output circuit means, whereby said oscillations applied to said output circuit means have an amplitude that is directly proportional to the limiting level of said limiting means.

6. An adjustable damping network comprising a source of signals, a source of auxiliary oscillations having an amplitude substantially greater than the amplitude of said signals and a frequency greater than the frequency of said signals, adjustable amplitude limiting means comprising first and second rectifiers, a source of an adjustable control voltage having first and second terminals, common resistor means connected between said first terminal and an electrode of the same polarity of each of said first and second rectifiers, direct current conductive means for applying the vectorial sum of said signals and oscillations between the other electrode of said first rectifier, and output circuit means connected between the other electrode of said second rectifier and the second terminal, said output circuit means comprising output terminal means and filter means for applying only oscillations of the frequency of said signals to said output terminal means, whereby said oscillations applied to said output terminal means have an amplitude that is directly proportional to the amplitude of said circuit voltage.

7. The damping network of claim 6 comprising third and fourth rectifiers, a source of a second adjustable control voltage equal in amplitude but opposite in polarity to said first mentioned control voltage, second common resistor means for connecting said second source to an electrode of the same polarity of each of said third and fourth rectifiers, and means for connecting to the electrodes of said third and fourth rectifiers to said other electrodes of said first and second rectifiers respectively, the interconnected electrodes of said third and fourth rectifiers being of opposite polarity with respect to the interconnected electrodes of said first and second rectifiers.

8. The damping network of claim 6 in which said means applying the vectorial sum of said signals and oscillations to said first rectifier comprises a first transformer having a primary winding connected to said source of signals and a center tapped secondary winding, one end of said secondary winding being connected to said other electrode of said first rectifier, said source of oscillations being connected between said center tap and said second terminal, and said output circuit means comprises a second transformer having a center tapped primary with one end connected to said other terminal of said second rectifier and the center tap connected to said second terminal, and a secondary winding connected to said filter means; comprising a second amplitude limiting means having third and fourth rectifiers serially connected between the other end of said secondary winding of said first transformer and the other end of said primary winding of said second transformer, a source of a second adjustable control voltage, and resistor means connecting the junction of said third and fourth rectifiers to said source of second control voltage.

References Cited

UNITED STATES PATENTS

| | | | |
|---|---|---|---|
| 2,848,609 | 8/1958 | Ruthroff | 307—88.5 |
| 3,196,359 | 5/1965 | Giger | 328—171 X |

OTHER REFERENCES

The Bell System Technical Journal, "Amplitude Modulation Suppression in FM Systems" by C. L. Ruthroff (pages 1023–1046) July 1958.

J. S. HEYMAN, *Primary Examiner.*

ARTHUR GAUSS, *Examiner.*

J. ZAZWORSKY, *Assistant Examiner.*